Oct. 21, 1952 W. D. MERRILL ET AL 2,614,893
AGRICULTURAL SCAFFOLD
Filed June 24, 1947 3 Sheets-Sheet 1
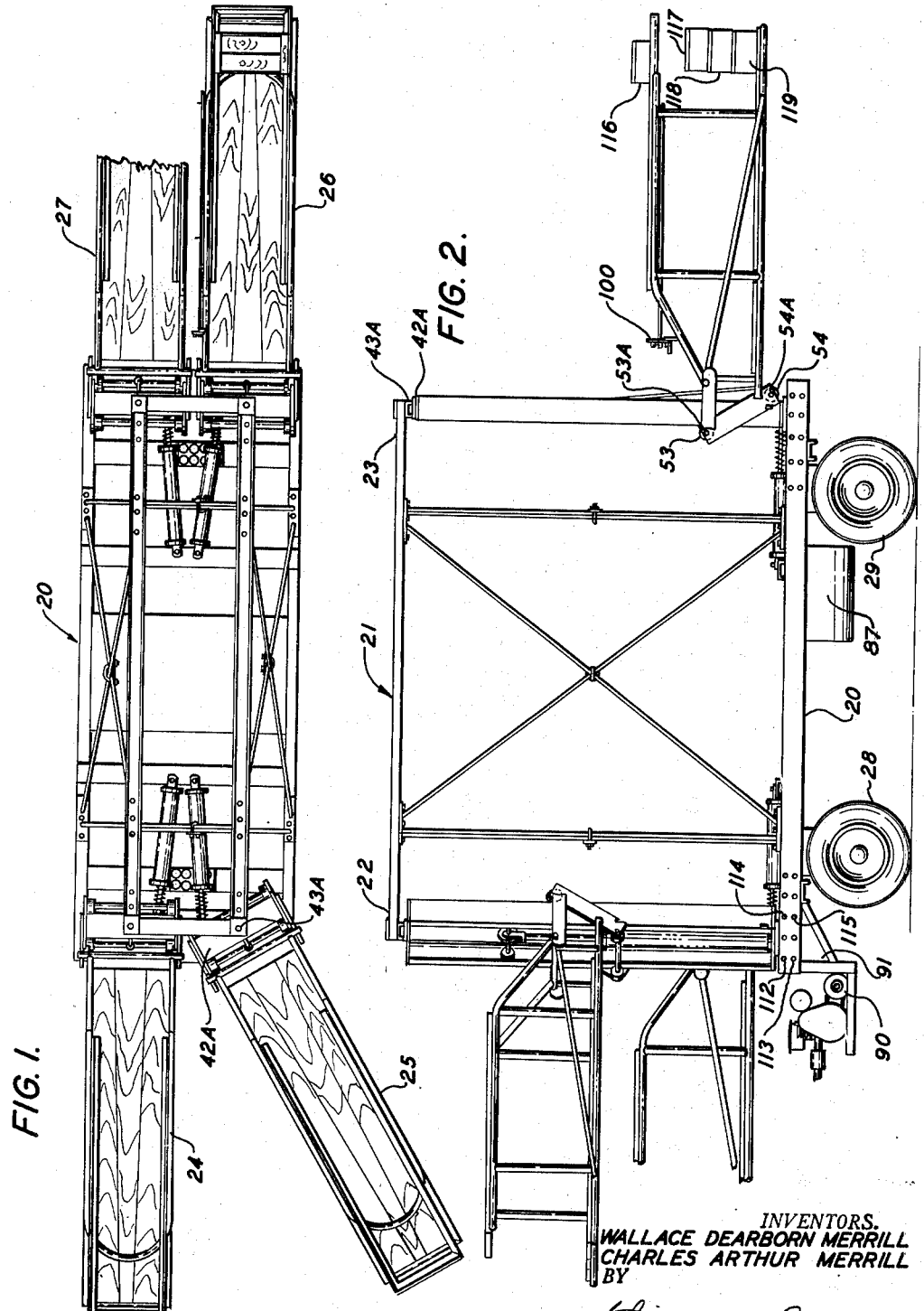
INVENTORS.
WALLACE DEARBORN MERRILL
CHARLES ARTHUR MERRILL
BY
Chester and Angus
ATTORNEYS

INVENTORS.
WALLACE DEARBORN MERRILL
CHARLES ARTHUR MERRILL
BY

ATTORNEYS

Oct. 21, 1952 — W. D. MERRILL ET AL — 2,614,893
AGRICULTURAL SCAFFOLD
Filed June 24, 1947 — 3 Sheets-Sheet 3
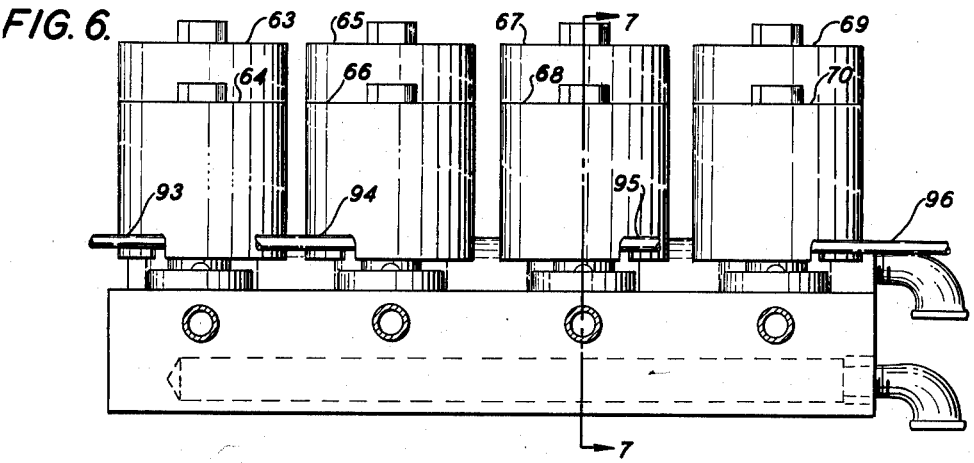
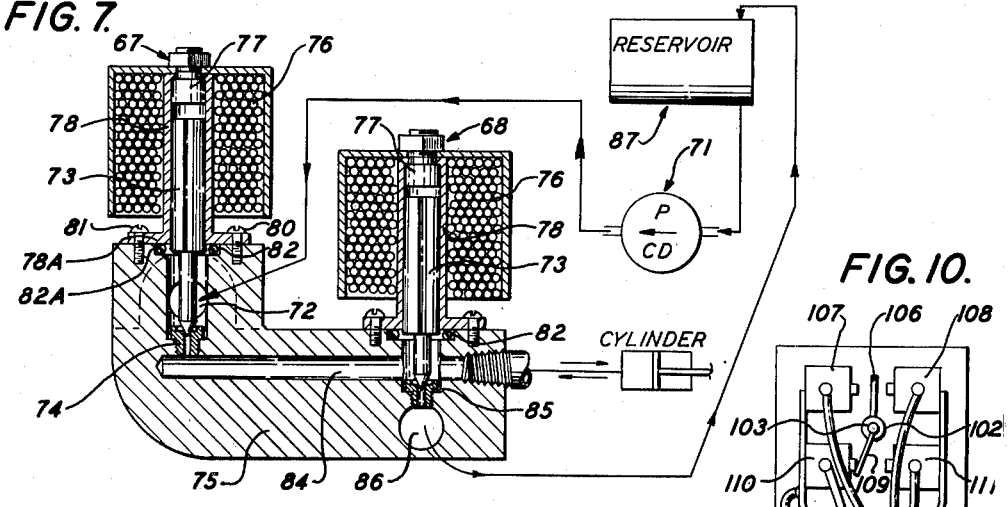
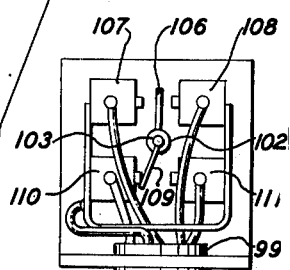
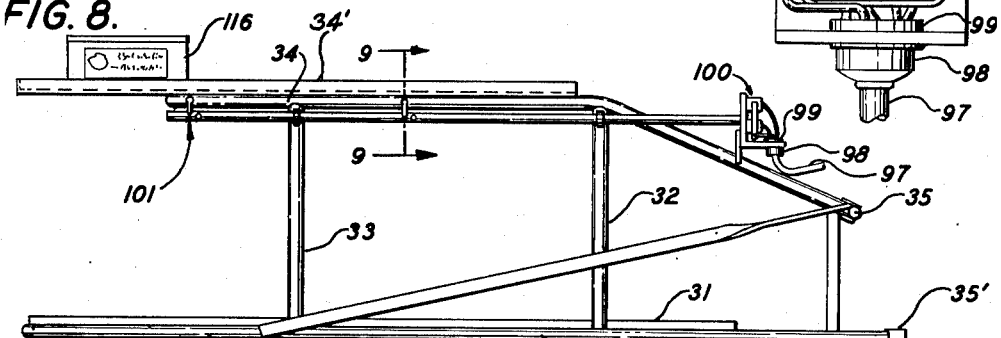
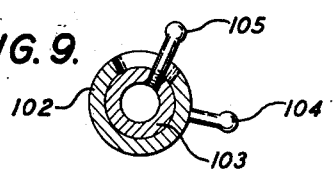
INVENTORS.
WALLACE DEARBORN MERRILL
CHARLES ARTHUR MERRILL
BY
Christy and Angus
ATTORNEYS Patented Oct. 21, 1952

2,614,893

UNITED STATES PATENT OFFICE 2,614,893

AGRICULTURAL SCAFFOLD

Wallace Dearborn Merrill, Monrovia, and Charles Arthur Merrill, Santa Barbara, Calif.

Application June 24, 1947, Serial No. 756,648

4 Claims. (Cl. 304—29)

This invention is concerned with agricultural scaffolds particulary adapted for orchard use. The equipment of the invention may be employed to improve efficiency and safety in operation such as picking, pruning, spraying, etc., and enables operators to attain proper positions quickly and safely and to change this position at will without descending to the ground. The invention thus eliminates much waste motion. Moreover, it provides secure footing and leaves an operator with both hands free to work, the result being a reduction in damage to fruit during the picking operation. In its preferred form, the apparatus of the invention is such that fruit may be packed in shipping containers in the orchard, thus reducing handling and damage due to handling.

Recent research by agricultural economists in fruit picking and gathering operations indicated that almost 22% of a man's time is involved in going up or down or moving the picking ladder, another 10% of the time being employed in emptying the container, say a bucket, in which the fruit is dropped following picking. Moreover, the conventional fruit picking ladder provides insecure footing, with the result that the picker does not work as rapidly as he would if his footing were more secure. The result is a marked decrease in efficiency as compared to similar operations conducted on the ground. This problem becomes aggravated by decreases in the quality of picking labor and increases in the wages of such labor. Consequently, there is a marked need for an efficient apparatus which will enable a picker, pruner or sprayer to rapidly and conveniently reach various portions of the tree and to be secure in his footing during such operations with his hands free to work.

We have developed an agricultural scaffold which comprises an upright support, a platform mounted at one end of the support and movable up and down with respect to the support and means for swinging the platform about the upright axis of the support. In its preferred from the platform is cantilevered from the support and the apparatus is provided with powered means for moving the platform up and down and also for swinging it on the axis of the support. If such a scaffold is mounted on a wagon or the like, an operator, say a fruit picker, may gain easy access to all portions of the tree by moving the platform up and down, by swinging it on its axis, and also by moving back and forth on the platform.

Preferably the equipment of the invention is provided with controls mounted on the platform itself so that the operator may control his position from the platform.

In a preferred form of the apparatus of the invention there is a base member, say a picking platform mounted on a wagon or trailer, an upright track rotatably mounted on this base member to swing on an upright axis, and a scaffold or platform mounted on the track to move up and down thereon and extending out from the track as a cantilever. Means controlled from the scaffold are provided for swinging the track and other control means mounted on the scaffold permit it to be moved up and down on the track. Preferably the powered means for swinging the track and for moving the scaffold up and down along the track are hydraulic cylinder-piston combinations. These are provided with valves for controlling the flow of fluid to and from the cylinders, and the valves are solenoid operated from switches mounted on the scaffold.

For large scale operations in orchards and the like, it is desirable to mount a plurality of the scaffold devices on a single platform, say something approaching a wagon or truck bed in size. The platform may be employed for packing the fruit as it is removed in containers from the scaffold or it may be employed to hold a supply of boxes or other containers. For safety and ease of operation, the scaffold should have a railing running substantially around it at waist height and the controls for raising and swinging the scaffold may be mounted on this railing.

In a typical picking operation, an apparatus having four scaffolds is provided. These are mounted respectively at the four corners of a wagon, truck or trailer body which is drawn through the orchard between rows. The body is stopped opposite two trees and the operators swing their scaffolds out so that in plan the apparatus assumes an H shape, permitting the operators to work on the sides of the trees. When the sides are picked, the scaffolds are swung so that their long axes are parallel with the long axis of the body, the shape in plan, being that of a long "I," and the body is pulled forward so that the portions of the trees facing the alley (down which the body is moved) are accessible.

Each picker controls the position of his own scaffold, raising and swinging it by means of switches mounted on the scaffold and having long control rods passing along a railing at waist height so as to be accessible at any point. In the case of peaches and other fruit which may be sent directly to market without an intervening washing operation, etc., the fruit is picked directly into lug boxes. The picker slides the lug box ahead of him on tracks disposed at railing height and as each is filled he stacks it on the outside end of the platform. The stacks are removed periodically when the scaffold is near the ground and transferred directly out of the orchard or to the body of the trailer, which may serve as a final packing platform.

In the case of fruit such as oranges which are less easily damaged, the packer operates with a long tube or sack having an open mouth fastened at his waist. The fruit is dropped into the tube and travels to the end, where it is lodged temporarily in fairly large lots, so that subsequent handling is facilitated.

These and other aspects of our invention will be apparent in the light of the following detailed description taken in conjunction with the accompanying drawings in which:

Fig. 1 is a plan view of a preferred form of agricultural scaffold provided with four scaffold elements;

Fig. 2 is a side elevation of the apparatus of Fig. 1;

Fig. 6 illustrates a valve assembly particularly designed for use in the apparatus of Figs. 1 to 5;

Fig. 7 is a section through the valve assembly of Fig. 6 taken along the line 7—7;

Fig. 8 is a side view of one of the scaffolds of the apparatus and illustrates the switch control means;

Fig. 9 is a sectional elevation through the switch controls of Fig. 8 taken along the line 9—9 of that figure; and Fig. 10 is an end view of the switch of Fig. 8 showing the manner in which the controls of the solenoids are operated.

Figure 3:
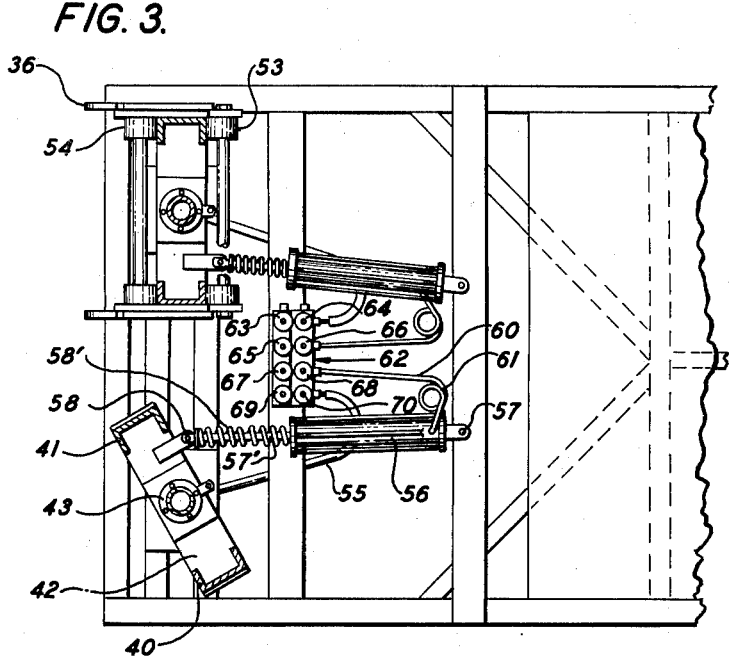
Fig. 3 is a fragmentary plan view partly in section of one end of the apparatus of Figs. 1 and 2 and showing the means employed for swinging the tracks upon which the scaffolds slide.
Figure 4:
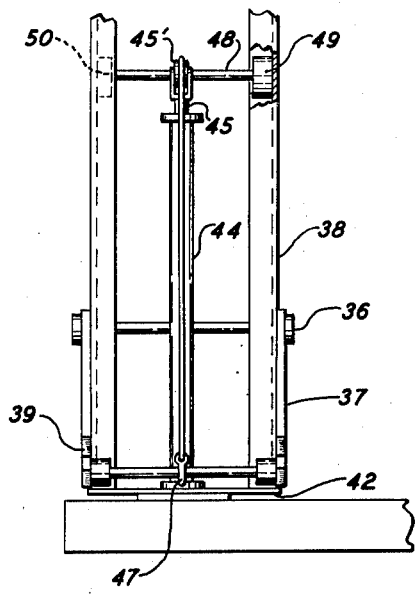
Fig. 4 is a fragmentary end view of the apparatus of Figs. 1, 2 and 3, illustrating the hydraulic cylinder-piston combination employed to raise or lower the scaffold on its track.

Referring to the drawings and particularly to Figs. 1 and 2, the apparatus comprises a platform 20 rectangular in plan and made of structural steel members or the like. This platform carries a light steel superstructure 21 in the form of a cross-braced skeleton box and having cantilevered upper end portions 22, 23. The apparatus is provided with four scaffolds 24, 25, 26 and 27 mounted in pairs adjacent the ends of the platform. Each scaffold, by means described hereinafter, may be raised while maintained in approximately horizontal position and at the same time swung on an upright axis passing through the end of the platform, thus permitting an operator, say a fruit picker, to adjust his position to the requirements of the job.

If desired, the platform 20 may be mounted on wheels 28, 29 or it may be placed on the body of a motor truck. The particular structure illustrated by Figs. 1 and 2 is designed to be tractor drawn, and the tractor through power take off and a pump, supplies hydraulic power to move the scaffolds.

The scaffolds are detachable. The general structure of a scaffold is perhaps best seen in Fig. 8. Thus each scaffold has a horizontal base frame 30 made of pipe, light structural steel, or the like. This supports a floor 31 of wooden plank and has uprights 32, 33 which in turn support a railing 34 at approximately waist height above the floor. The railing acts as a safety guard for the operator and also provides a rest for a box or the like, into which picked fruit is placed.

Thus the railing 34 may be provided with tracks 34' into which a picking box 116 fits. These tracks are simply horizontal angle irons turned in and so spaced from each other that the picking box is held between them in a longitudinally slidable position.

Figure 5:
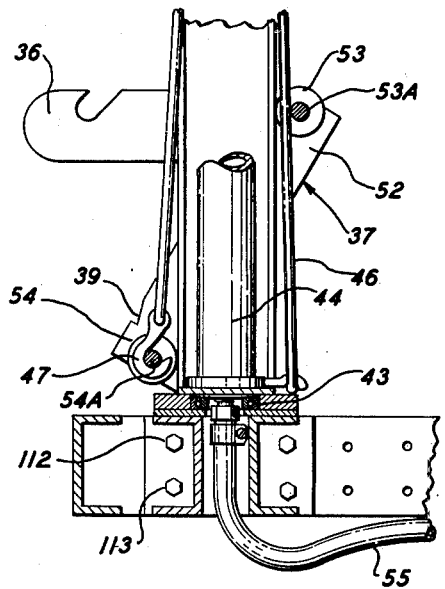
Fig. 5 is a fragmentary sectional elevation taken through a portion of the apparatus of the preceding figures and illustrates various details of construction including a rider on which the scaffold is hung.

The railing is bent down at the end at which it is attached to the rest of the apparatus and is provided with a cross bar 35 which hooks into hooks 36 on a rider 37 which moves up and down along a track 38 (see Fig. 5). U-shaped members 35' are provided below the bar 35 and fit into notches 39, on the rider. Thus the scaffold is firmly held as a cantilever on the rider but may be detached simply by tipping up its unattached end.

The upright track upon which the rider travels comprises a pair of inturned channels 40, 41 disposed parallel with each other and tied together by a base member 42 and a top across tie 42A (see Fig. 1). The base member has a central bearing 43, say a ball race, upon which it and the track turn, the axis of rotation being vertical, and a coaxial bearing 43A at the top of the track holds it to the cantilevered ends of the superstructure.

A hydraulic cylinder 44 is mounted coaxially above the bearing and carries a piston 45 which moves up with hydraulic pressure and drops when the pressure is released. The piston carries a pulley 45' on its upper end. A cable 46 is attached to the track base 42, passes up and over the pulley and is connected to the rider by means of a hook 47. As the piston is raised, the scaffold, due to the mechanical advantage of two imparted through the pulley, rises twice as far as the piston and pulley. The pulley 45' is mounted on a cross shaft 48 which carries wheels 49, 50 on its ends. These wheels ride respectively, inside the two channels or tracks and are guided thereby.

The rider comprises a pair of the horizontal hook plates 36, a pair of slanting plates 52 attached respectively to the inner ends of the hook plates by welding or the like, a pair of upper rollers 53 which ride respectively on the outside of the inner flanges of the track and a pair of lower rollers 54 which ride below on the outside of the other flange of the track. The upper rollers turn on a horizontal shaft 53A held in the rider. Similarly, the lower rollers turn on a horizontal shaft 54A mounted in the rider.

Due to the downward pressure exerted on the hook plates by the scaffold, the rollers 53 and the rollers 54 are pressed against the track and hold the rider securely while permitting it to run up and down.

Fluid, say oil, is supplied to the elevating cylinder 44 of each scaffold through a conduit 55, say a flexible hose, connected to the bottom of the cylinder through the plate 42 (see Fig. 5).

The upright track of each scaffold assembly is turned on its vertical axis by a hydraulic cylinder 56 which is hinge-mounted to the platform at a pivot 57. The cylinder has a piston 57' which is attached by a pivot 58 to one side of the base 42, so as to develop a turning movement around the vertical axis of the track. A tension spring 58' is fastened between cylinder and pivot 58 and is concentric with the rod of the piston 57'. The spring pulls the track back into position after it has been swung by the cylinder-piston combination. Fluid, say oil, is supplied to the cylinder by a pipe 60 which is resilient and is provided with a spring coil portion 61. This permits the cylinder to swing slightly on the pivot 57 without breaking connections.

A flow of fluid to the cylinder which swings the track and to the elevating cylinder which raises and lowers the scaffold is controlled by a valve manifold 62 (see Fig. 3). Thus the hose 55 and the pipe 60 are both connected to this manifold.

Details of the manifold may be seen in Figs. 6 and 7. The manifold is composed of eight solenoid valves 63, 64, 65, 66, 67, 68, 69, 70 disposed in pairs. Thus the solenoid valves 63, 64 control the raising of one scaffold while the next pair 65, 66 control the swinging of the track upon which that scaffold is mounted. The next pair 67, 68 control the swinging of the adjacent track while the last pair 69, 70 control the raising and lowering of the scaffold mounted on this track.

The flow of fluid in the hydraulic system may best be seen in Fig. 7 wherein a pump 71 supplies oil under pressure to a cross conduit 72 that feeds the solenoid valves 63, 65, 67, 69. A needle 73 of such solenoid operated valve, say the valve 67, is seated on a removable seat 74 which is screwed into a base member 75. The solenoid has a coil 76 and a magnetizable upper core 77. The needle is likewise magnetizable and its upper portion is of enlarged cylindrical section. When the needle is seated there is a gap of say ⅛ inch between the upper core and the top of the needle. When the coil is energized the needle is pulled up and the valve is opened. The bearing 78 in which the needle slides up and down is fastened to the valve body by means of screws 80, 81 which squeeze an O ring 82 in an annular recess 82A and thus afford a tight seal. The bearing has a lower portion 78A of circular cross section which fits in the annular recess and thus assures proper centering of needle in the seat. When the valve stem 73 is raised, oil forced by the pump passes down through the valve seat 74 into a cross conduit 84 and thence to the cylinder to be operated. Each cylinder, of course, contains a piston which is pushed out and thus the required movement, either the swinging of the track or the raising of the scaffold on the track is accomplished.

The other solenoid valve 68, in Fig. 7, is similar in construction to its mate 67, and is pulled to the open position by energizing its solenoid. This permits the fluid to flow back out of the cylinder through a valve seat 85 and thence to a return manifold 86 which is also similarly connected to the valves 64, 66, 68 and 70. The oil flows lengthwise through this manifold back to the reservoir 87. The return of the oil to the manifold permits the piston to slide back in the cylinder, thus permitting the lowering of the scaffold or the return swing of the track as the case may be.

The piping system for the oil is so designed that in the event of a break the oil is forced sidewise or down, rather than upward. Thus, there is no danger of spraying oil on equipment, operators or trees.

As previously indicated, the pump for supplying the necessary hydraulic pressure may be mounted on a tractor (not shown) which pulls the scaffold assembly. However, an auxiliary pump 90 is mounted below the platform at one end thereof and driven by a gas engine or the like placed on a common bracket 91. The reservoir or pressure tank 87 may be disposed at any convenient point either on the platform or on the tractor, but preferably is mounted below the platform as shown in Fig. 2, so as to leave the platform free for packing operations, etc.

Wires 93, 94, 95, 96 which energize the solenoids of the manifold are connected to the respective operating platforms through cables. Thus the four solenoids at one end of the manifold are connected through a cable 97 to the adjacent scaffold, connection being made by means of a pronged plug 98 in a socket 99 which in turn connects with a quadruple switch 100 that is controlled from the operating platform (see Fig. 8).

A switch control 101 comprises a horizontal outside tube 102 and an inside horizontal tube 103 which is journaled within it. The outside tube has a series of handles 104 along its length which permit it to be rotated on its axis. This plurality of handles is provided so that there is always one within convenient reach of the operator. The outside tube controls that solenoid valve combination which in turn controls the cylinder that raises and lowers the scaffold. The apparatus is so arranged that when the handle 104 is pressed down the scaffold will move down and when it is pressed up the scaffold will move up. Similarly, the inside tube has a series of operating handles 105. When these operating handles are pressed to the left the scaffold will be swung to the left and vice versa. The manner in which this is accomplished is best shown in Fig. 10 wherein a contactor 106 fastened to the end of the outside tube 102 swings to a switch 107 when the movement is to be upward and to a switch 108 when the movement is to be downward. Similarly the inside tube 103 carries a contactor 109. When this contactor is swung to the right to contact the switch 110 the scaffold will be swung to the right, similarly if the contactor 109 is swung to the left to contact 111, the scaffold will be swung to the left. In this manner control of the apparatus is most natural and the operator has only to throw a switch handle in the direction in which he wants to move. The contactors close the switches they touch and these switches, through their cables, energize the appropriate solenoids and open the valves required to accomplish the desired motion. By way of example, consider the case of the lower left hand scaffold shown in Fig. 3. The raising of this scaffold is accomplished by the solenoid valve 69 which is in turn controlled by the switch 107; the lowering being controlled by the solenoid valve 70 through the switch 108. Similarly, the counter-clockwise swing of the track on which this scaffold is mounted is controlled by the switch 110 which actuates the solenoid valve 67, and the return swing is controlled by the switch 111 which actuates the solenoid valve 68.

Since the up and down motion and the swinging motion may be obtained simultaneously, the operator may move both the switches at once. For example, if he wants to swing up and to the right this may be accomplished in a single motion.

It will be noted that the track upon which the scaffold slides up and down is mounted on the base by means of bolts 112, 113, 114, 115 at the bottom and by a corresponding attachment at the top. If it is desired to move the scaffolds closer together this may be done very simply by moving the tracks in towards the center of the platform, employing additional bolt holes for this purpose. In this manner the apparatus may be adjusted to the particular spacing of trees in an orchard.

In practice, the apparatus with its four scaffolds is pulled through the orchard by a tractor which may be remotely controlled, if desired, from one of the operating scaffolds or from the central platform. The apparatus is placed in position between a row of trees and then all four scaffolds are swung up and out (from the position shown in Fig. 1). A variety of cycles of movement may be employed depending upon the size of the trees and their spacing but in general the apparatus is so moved through the orchard that the halves of the trees facing the lane adjacent the apparatus and along which it is pulled are picked at once, after which the apparatus is moved about one tree space. If desired, the picking may be accompanied by a packing operation conducted on the platform in the field as picking proceeds.

The footing of the pickers is secure and as the boxes 116 (see Fig. 2) are filled they are placed in tiers 117, 118, 119, on an extension of the scaffold. Periodically the stack of filled boxes is removed from the scaffold when it is close to the ground and transferred either directly to trucks for movement from the field or to the platform of the apparatus for further packing.

In picking citrus fruits, etc., a large packing box may be mounted at some point on the scaffold. The picker employs a sack or long tube one end of which is in front of him at waist level, the other being connected to the box. Fruit as it is picked is dropped into one end of the tube and travels therethrough to the box at the other end.

Because of the rapidity with which the pickers can obtain operating position and with the secure footing provided, fruit picking with the apparatus of the invention is much more efficient, so that a given crew can pick approximately twice as much fruit.

The apparatus is useful in operations other than fruit picking for, as noted hereinbefore, it is equally applicable to spraying or pruning operations.

We claim:

1. In an agricultural scaffold, the combination which comprises a base member, a plurality of upright tracks rotatably mounted on the base member remote from each other to swing respectively on upright axes, a framework connecting the tracks at their upper ends in such a manner that each track contributes to the stabilization of the plurality of tracks, scaffolds mounted respectively on the tracks and movable individually from the base substantially the length of each of said tracks, separate hydraulic means to move the scaffolds on their respective tracks, separate hydraulic means to swing the respective tracks, solenoid operated valves mounted on the base member for separately controlling the several hydraulic means, and switches for controlling the solenoids associated respectively with the raising and turning means for each scaffold mounted respectively on that scaffold.

2. In an agricultural scaffold, the combination which comprises a base member, an upright track rotatably mounted on the base member to swing on an upright axes, a rider mounted on the track to move up and down thereon, and a scaffold detachably mounted on the rider, said rider including a pair of parallel hook plates, a pair of slanting plates fastened to the inner end of the hook plates, the arrangement being such that the outer ends of the hook plates and slanting plates lie on the same side of the track, a first pair of rollers affixed between the parallel hook plates and engaging the track on the side opposite the hooks on the plates, a second pair of rollers affixed between the slanting plates and engaging the opposite side of the track, and a notch in the outer end of each slanting plate, the scaffold being adapted to hook on to the hook plates and rest in the notches in the slanting plates and in so doing, to hold the first and second pair of rollers against opposite sides of the track.

3. Apparatus according to claim 1 wherein the framework connecting the tracks at their upper ends is fastened to the base member by braces connected to opposite sides of the framework and sloping outwardly and downwardly to the base member.

4. In an agricultural scaffold, the combination which comprises a base member, a plurality of upright tracks rotatably mounted on the base member remote from each other to swing respectively on upright axes, a framework connecting the tracks at their upper ends in such a manner that each track contributes to the stabilization of the plurality of tracks, scaffolds mounted respectively on the tracks and movable individually from the base substantially the length of each of said tracks, separate hydraulic means to move the scaffolds on their respective tracks, separate hydraulic means to swing the respective tracks, valve means for separately controlling the several hydraulic means, and means for controlling the valve means associated respectively with the raising and turning means for each scaffold and mounted respectively on that scaffold.

WALLACE DEARBORN MERRILL.
CHARLES ARTHUR MERRILL.

REFERENCES CITED

The following references are of record in the file of this patent:

UNITED STATES PATENTS

| Number | Name | Date |
|---|---|---|
| 659,197 | Allen | Oct. 2, 1900 |
| 969,164 | Johnstone | Sept. 6, 1910 |
| 2,196,511 | Wagner | Apr. 9, 1940 |
| 2,374,196 | Harbers | Apr. 24, 1945 |
| 2,410,030 | Horni | Oct. 29, 1946 |
| 2,425,302 | Calhoun | Aug. 12, 1947 |
| 2,428,184 | Swindler | Sept. 30, 1947 |
| 2,480,066 | Weaver | Aug. 23, 1949 |

FOREIGN PATENTS

| Number | Country | Date |
|---|---|---|
| 163,770 | Great Britain | May 18, 1921 |
| 414,161 | Great Britain | Feb. 21, 1933 |